Aug. 6, 1935.    W. REINERS ET AL    2,010,465
WINDING MACHINE
Filed Feb. 17, 1931    13 Sheets-Sheet 1

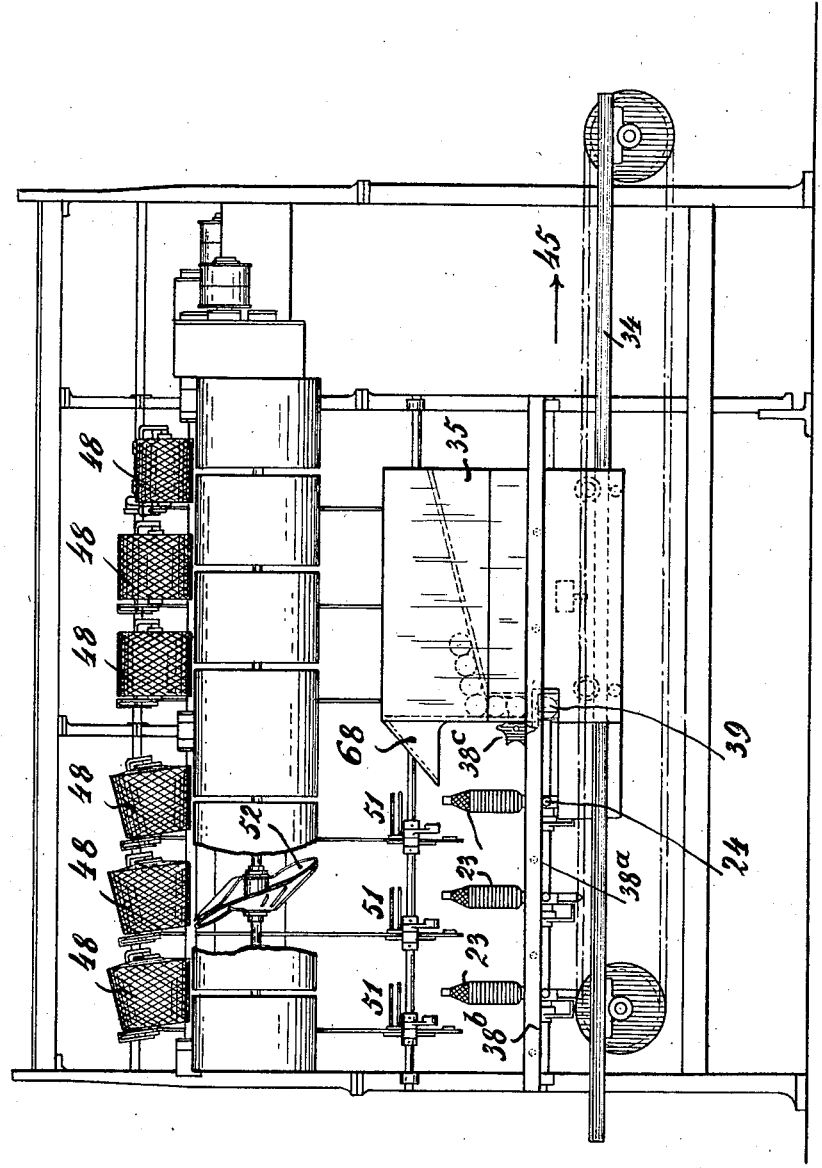

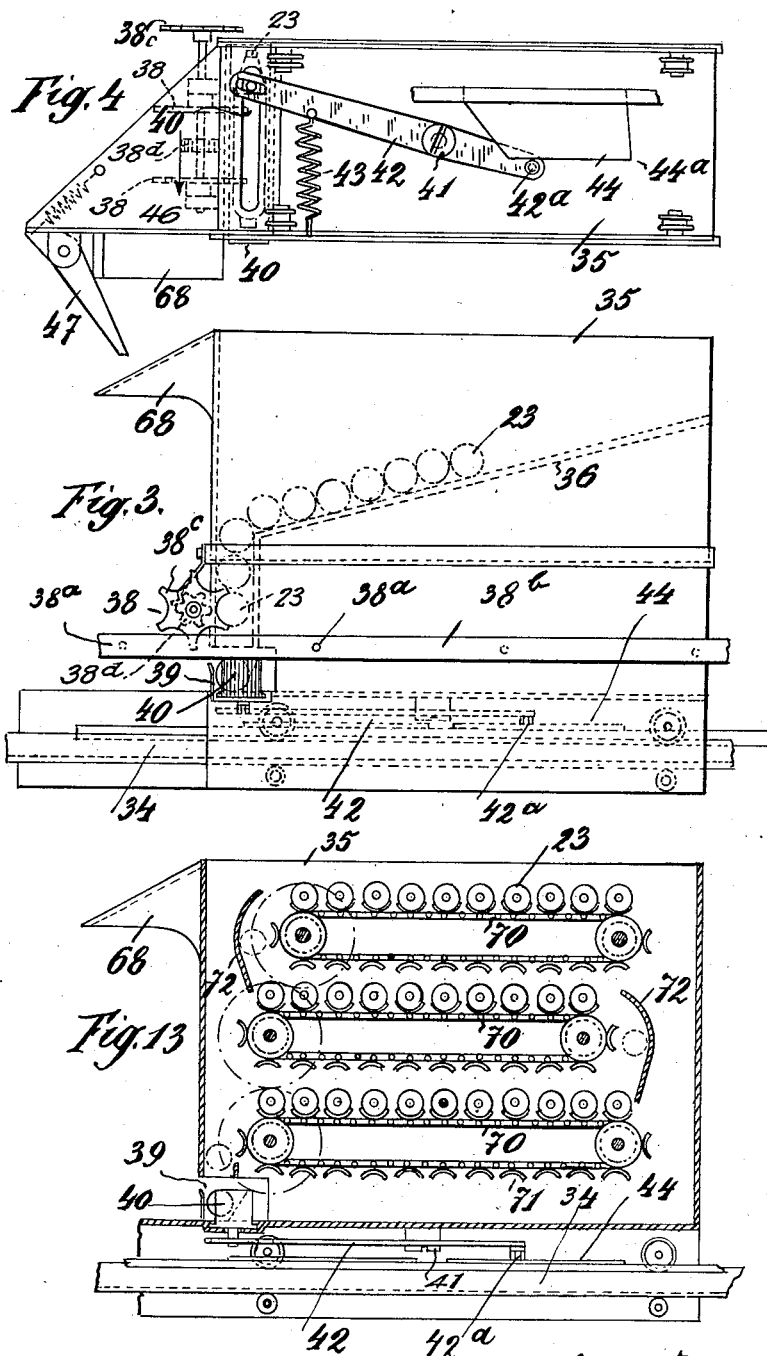

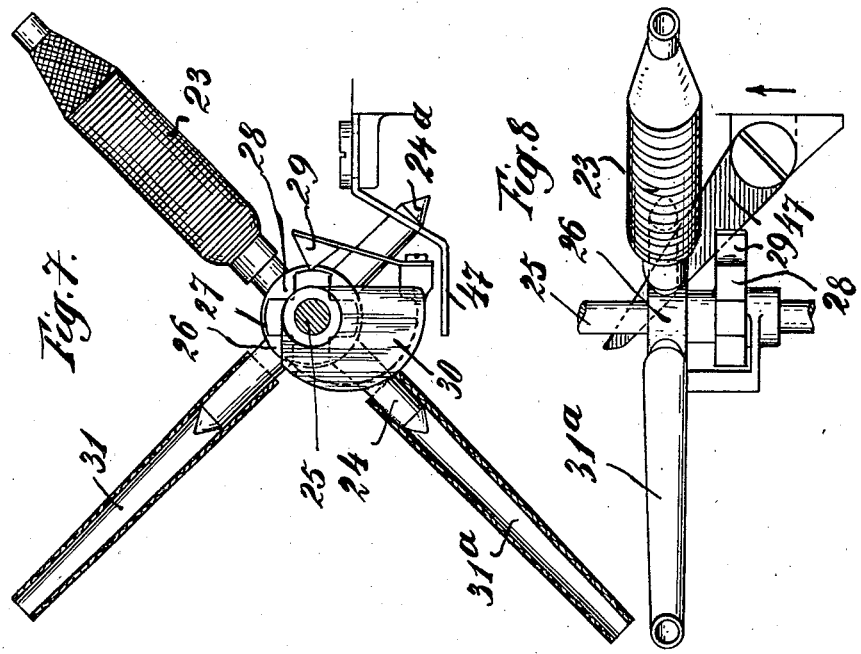
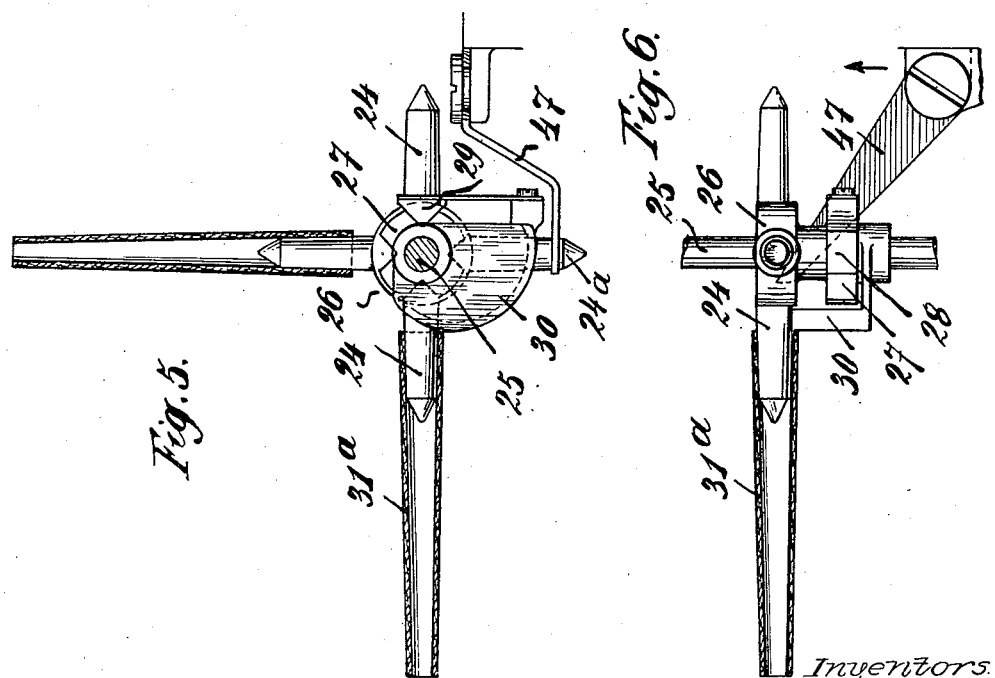

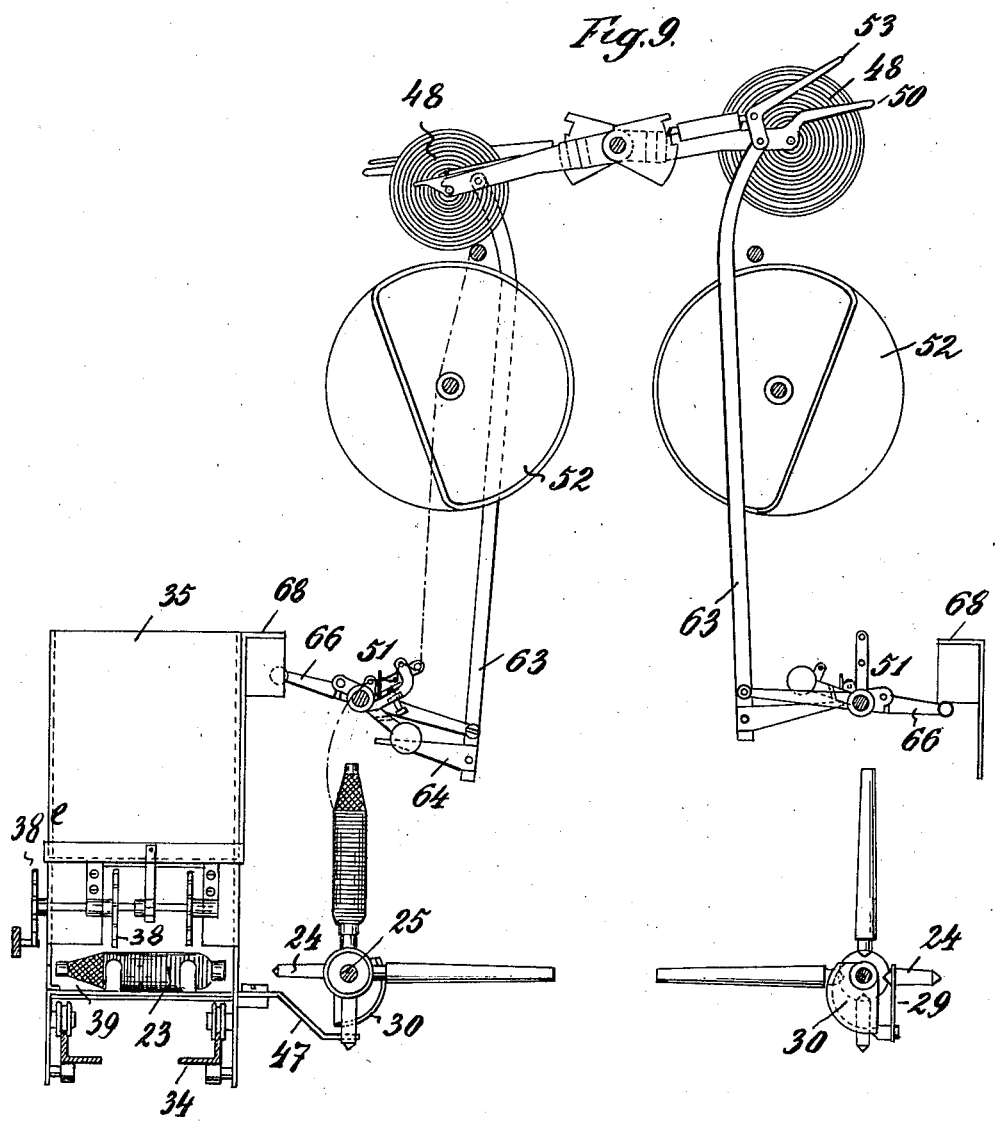

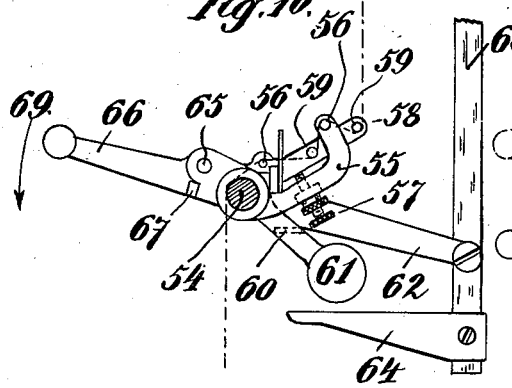
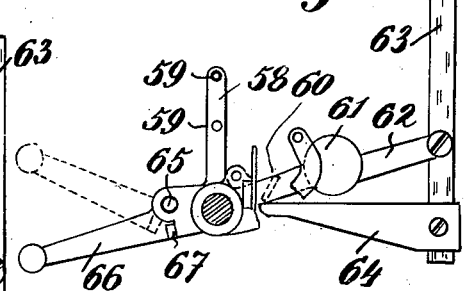
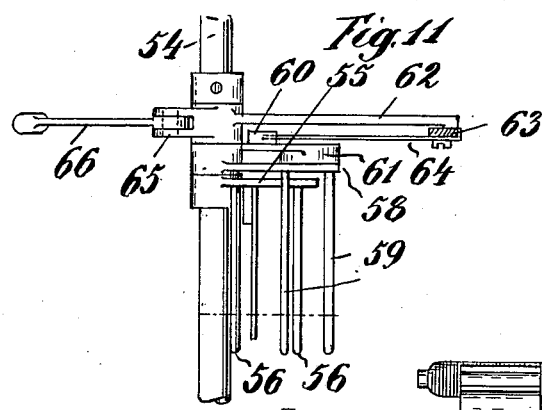
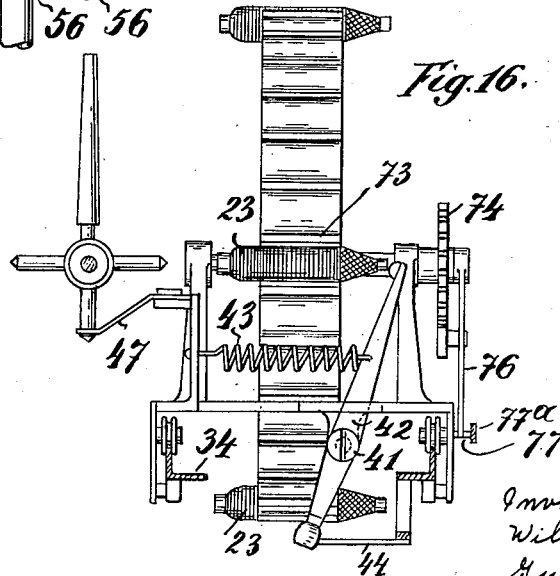

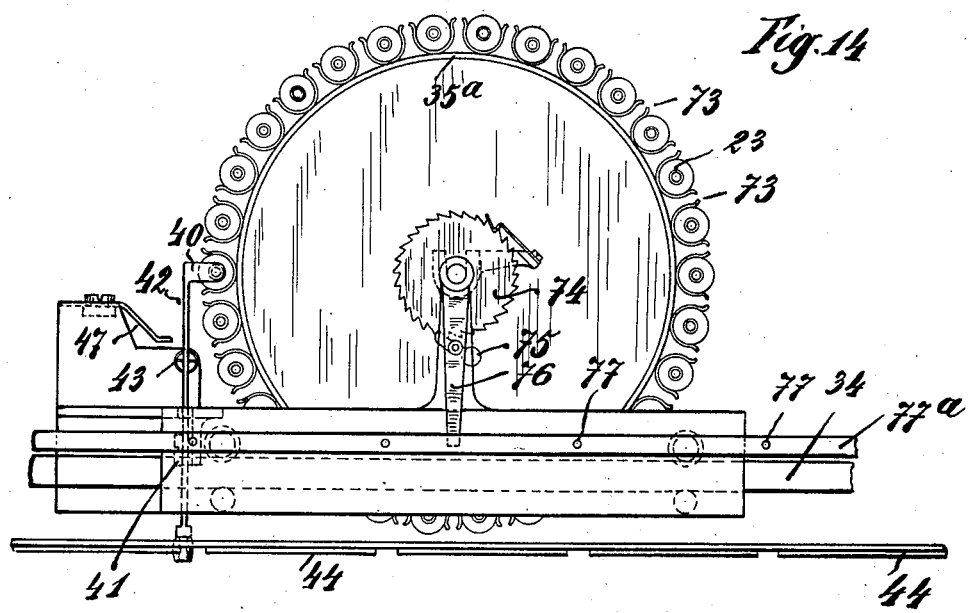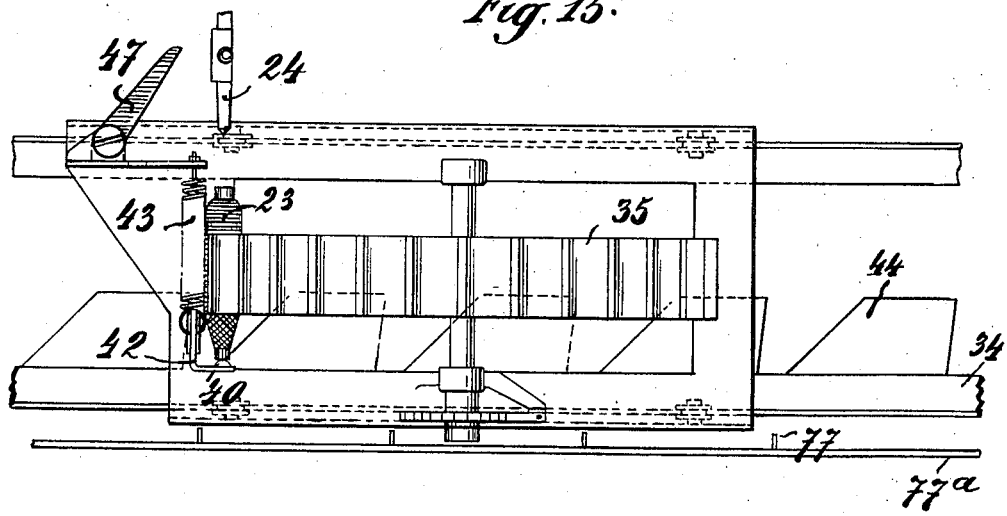

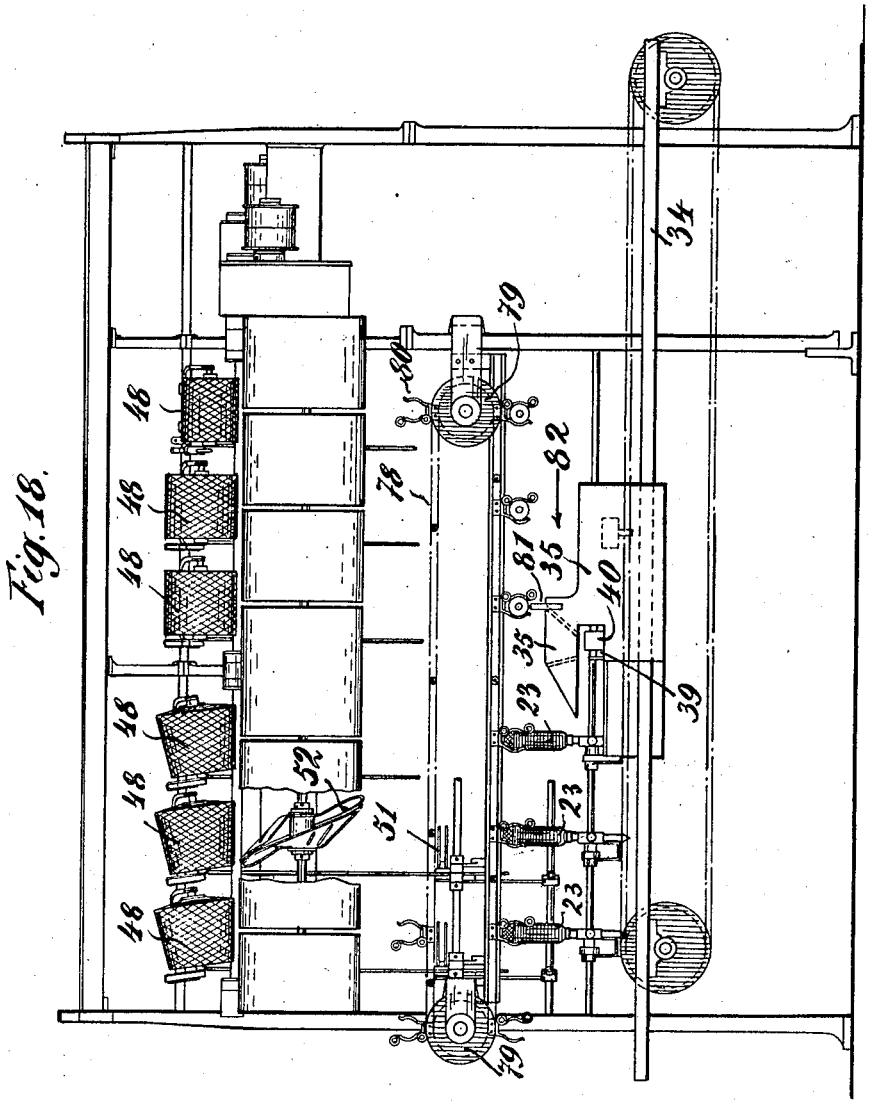

Aug. 6, 1935.  W. REINERS ET AL  2,010,465
WINDING MACHINE
Filed Feb. 17, 1931   13 Sheets-Sheet 10
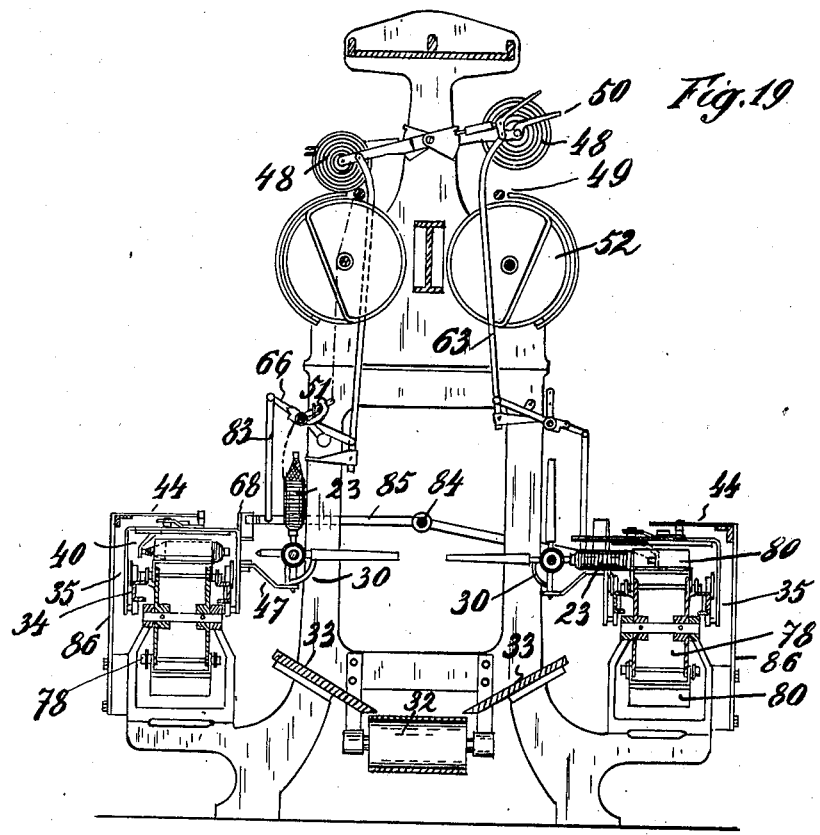
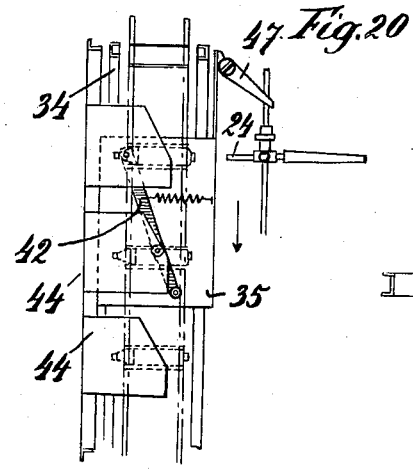
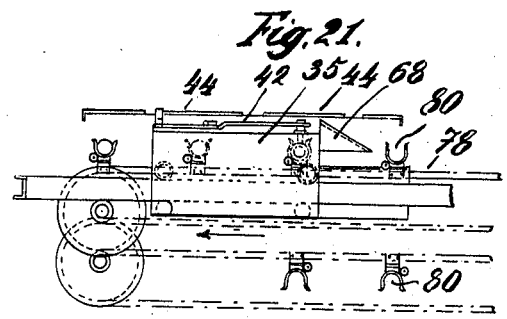

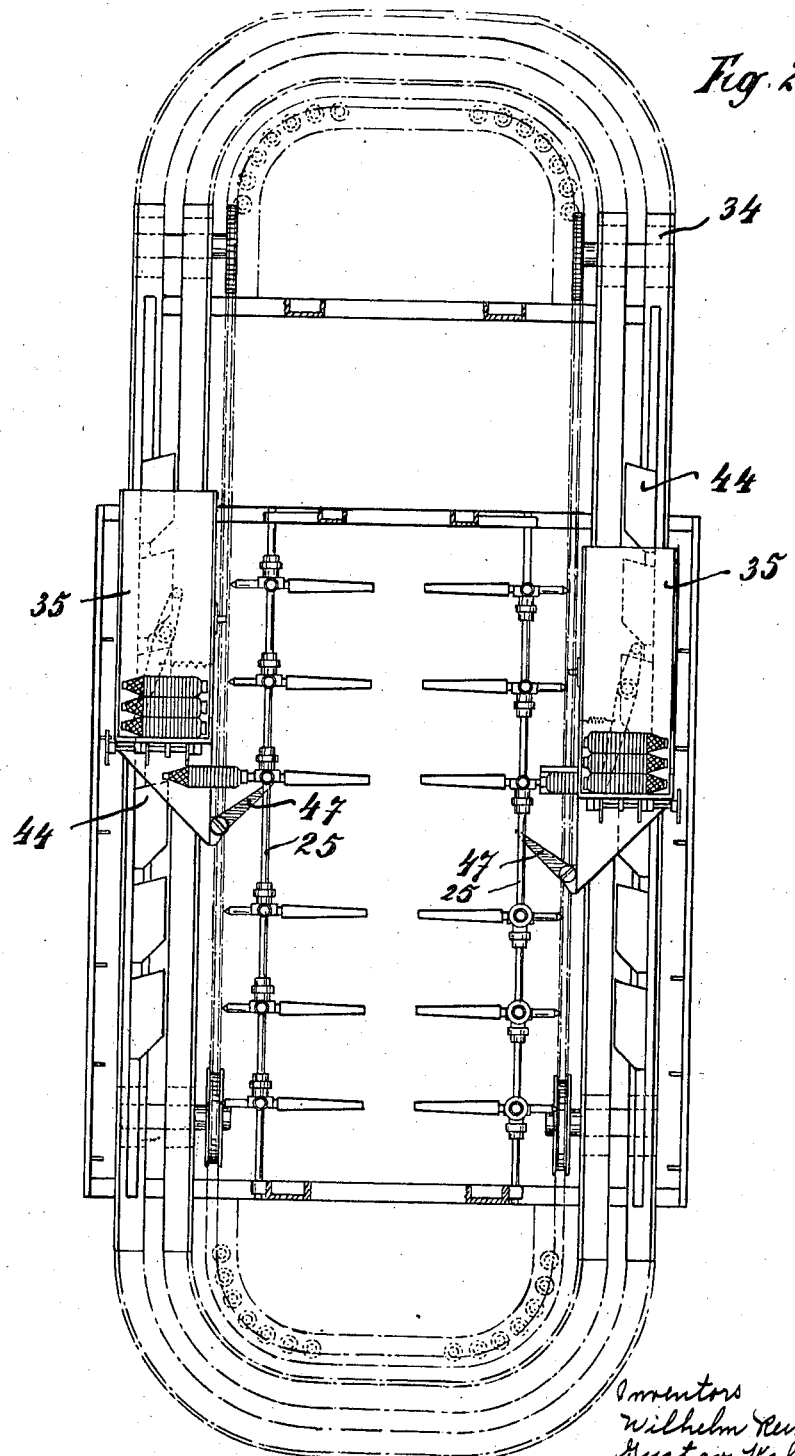

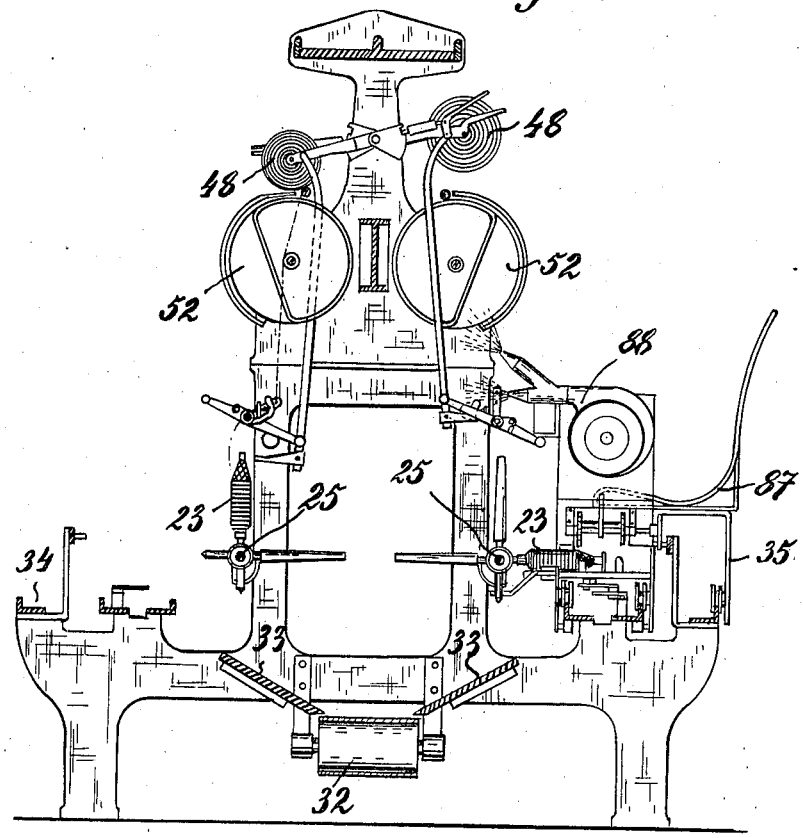

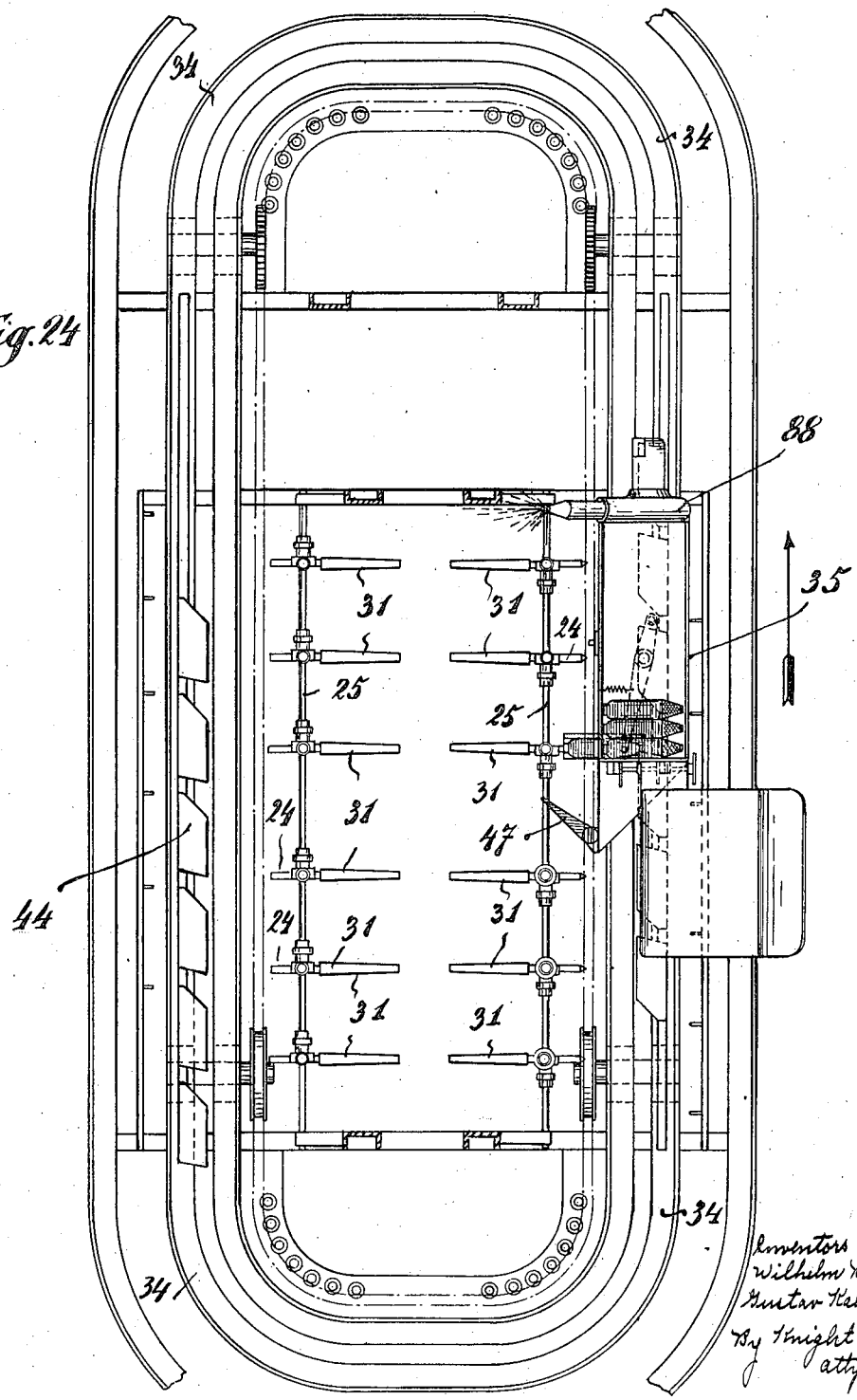

Patented Aug. 6, 1935

2,010,465

UNITED STATES PATENT OFFICE 2,010,465

WINDING MACHINE

Wilhelm Reiners and Gustav Kahlisch, Munich-Gladbach, Germany, assignors to W. Schlafhorst & Co., Munich-Gladbach, Germany, a corporation of Germany Application February 17, 1931, Serial No. 516,448
In Germany March 22, 1930

29 Claims. (Cl. 242—35.5)

In the winding frames hitherto known, the attendants themselves are obliged to place the creel or unwinding-bobbin of each spindle-unit in working position or in a preparatory or charging position specially provided for every separate spindle unit. Where such a preparatory or charging position is provided, the creel bobbin intended to replace the one previously run empty must be shifted into working position either by hand or by mechanical means. In order to ensure that a fresh creel bobbin is supplied to every spindle unit in good time, the attendants must be constantly running to and fro about the machine, which means that they are quickly tired and their productive capacity is correspondingly impaired. These unfavorable conditions are rendered worse through the great loss of time usually caused by the attendant herself having to fetch and take the bobbins to be unwound one by one to every particular spindle unit and to put them one by one in their place in the creel of the machine.

The object of the present invention is the elimination of these drawbacks of the methods employed to date. This object is attained by the bobbins to be unwound being mechanically transported to the spindle units of the winding frame, and being automatically placed in the preparatory or charging position and subsequently in working position, the work of the attendant being limited to grasping the end of the full bobbin which is already in position in the creel, tying it to the tail end of the yarn on the package being wound, and swinging the package cradle into working position, whereupon the winding process continues automatically.

Figure 1:
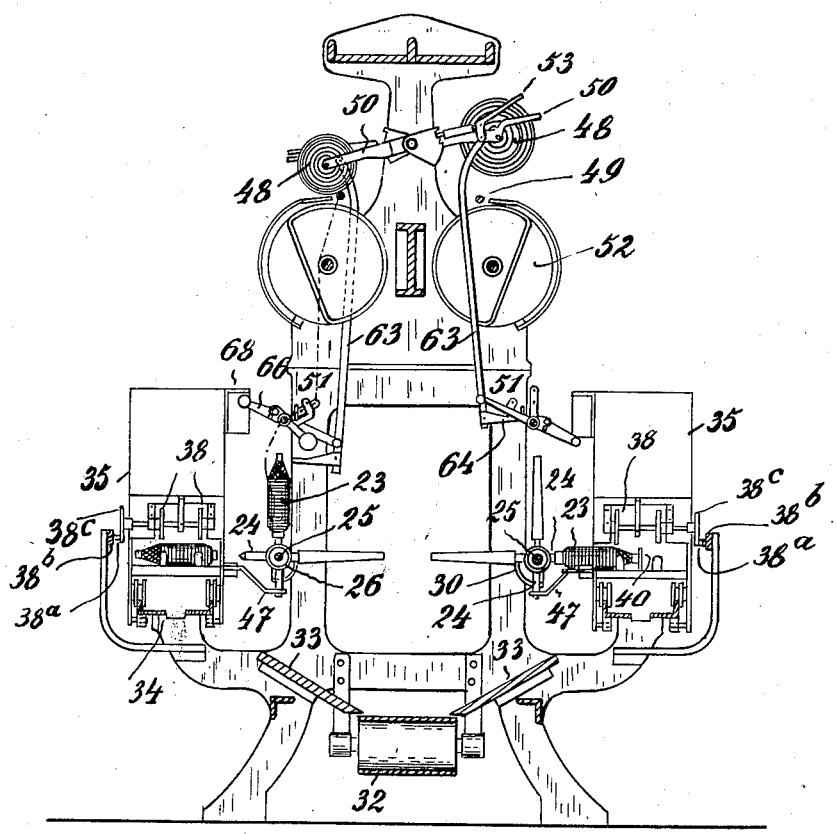
Figure 17:
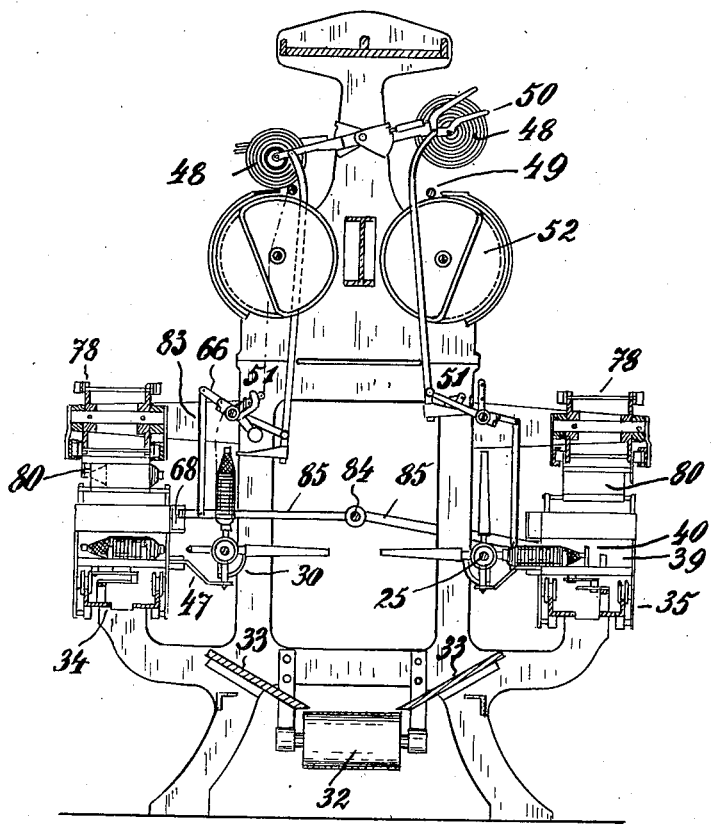

Fig. 1 is a front vertical section of one embodiment of the improved winding machine, Fig. 2 is a side elevation of the machine, Fig. 3 is a side view of the container for conducting the full spools to the individual spool positions, Fig. 4 is a bottom view of Fig. 3, Fig. 5 is a front elevation of a star-shaped spool holder consisting of four tongues, Fig. 6 is a top view corresponding to Fig. 5, Figs. 7 and 8 indicate different operative positions of the structure illustrated in Figs. 5 and 6 respectively, Figs. 9, 10, and 12 show in front elevation the apparatus for automatically lifting up the spools being wound and opening the thread tensioner by means of the travelling spool carrier, in various positions, Fig. 11 is a plan elevation of Fig. 10, Fig. 13 is a side elevation of a second embodiment of a full spool conducting apparatus, Fig. 14 is a side elevation of a third embodiment of a full spool conducting apparatus, Fig. 15 is a plan view of Fig. 14, Fig. 16 is a front view of Fig. 14, Fig. 17 is a front section of the machine wherein the conducting of the full spools is effected by an endless chain, Fig. 18 is a side elevation corresponding to Fig. 17, Fig. 19 is a front section of another embodiment of the construction shown in Fig. 17, Fig. 20 is a plan elevation of Fig. 19, Fig. 21 is a side elevation of Fig. 19, Fig. 22 is a plan elevation of the closed surrounding guide for the travelling container for the full spools, Fig. 23 is a vertical section of Fig. 22 showing in addition a cleaning device and an operator's seat or stand, and Fig. 24 is a plan view of Fig. 23.

Figures 1 to 12 show particulars of the first example. Figs. 1 and 2 illustrate creel pegs 24 fixed in the manner of a star on the circumference of a hub 26 rotatable round a horizontal shaft 25. The creel pegs are designed to hold the bobbin to be unwound, such as the one represented by 23. As shown in Figs. 5 to 8, the hub 26 has a collar 27 having on its circumference a number of notches 28 corresponding to the number of creel pegs, the notches being intended to engage with a spring click 29 to retain the hub 26 with the creel pegs in the proper position for easy unwinding. Along every star 26 is arranged a stationary curve plate 30, the edge of which practically bears on the adjacent creel pegs 24, the shape of the curve plate 30 being such that the empty creel bobbins are automatically stripped from the creel pegs. Fig. 5 shows the creel peg 24 at the moment in which the stripping of the empty bobbin 31a from it begins, while Fig. 7 shows the bobbin 31a stripped so far already that it automatically falls off.

The automatic control of the turning movement of the stars 26 will be described later on.

In the lower part of the machine and preferably in the middle of it, an endless conveyor belt 32 can be arranged in known fashion. The upper edges of the belt can be bordered on either side by slanting lateral sliding plates 33, to ensure that the empty bobbins or tubes are automatically collected by the travelling conveyor belt, to be ultimately deposited at a convenient spot.

The bobbins 23 are automatically distributed and fixed on creel pegs 24 by suitable arrangements such as the one shown in Figs. 1 and 2, where a carriage 35 travels on rails 34 arranged on either side of the machine. Fig. 3 is an enlarged side view of the carriage, and Fig. 4 shows it seen from below. In the carriage 35, the bobbins 23 to be fed are heaped on the slanting bottom 36 from which they automatically descend into the reach of a star-shaped distributer 38 as shown in Figs. 1, 3, 4, and 9. The star-shaped distributer 38 is partially turned intermittently by its ratchet wheel 38c of the same configuration coming into contact with projections 38a of a stationary rod 38b when the carriage 35 is displaced. The star-shaped distributer 38 feeds the bobbins singly into the channel or compartment 39 of a slide 40 in the carriage. A locking ratchet 38d is mounted on the shaft carrying the advancing ratchet wheel 38c and the distributor wheels 38, with which cooperates a locking pawl, whereby the distributor is held against accidental rotation. Hinged on the slide 40 is a double armed lever or actuator 42 which is pivoted at 41 and is subject to the pull of a spring 43. The antifriction roller 42a at the opposite end of lever 42 is adapted to slide on stationary deflectors 44 distributed in the path of the carriage 35, as shown in Figs. 4, 15, 16, 22, and 24. When the carriage 35 is shifted in the direction of the arrow 45 by a length corresponding to the gauge of the spindles (see Fig. 2) then the lever 42 (Fig. 4), the antifriction roller 42a of which has in the meantime been deflected by one of the stationary deflectors 44, will arrive at the corner 44a of the deflector 44 at the moment in which the feed bobbin in the channel or holding compartment 39 of the slide 40 is opposite one of the empty creel pegs 24. The slightest further motion of the carriage then releases the roller 42a from the corner 44a, and under the action of spring 43, the lever 42 swings instantly in the direction of the arrow 46, thus causing the shifter 40 hinged to the lever 42 to shift the particular bobbin 23 then resting in its channel 39 on to the creel peg 24, as shown on the right hand side of Fig. 1.

The full bobbin having now been placed on the peg 24 by means of carriage 35 travelling in the direction of the arrow 45, an articulated angle piece 47, (see Fig. 1 and Figs. 4 to 8), secured to the underside of the carriage and held in position by means of a helical spring which however allows it to recede in one direction, comes in the way of the empty creel peg 24a. Thereby the particular star 26 is forced to move gradually from the position shown in Fig. 5 to that shown in Fig. 7, and eventually into the working position shown in Fig. 1, in which the star 26 is retained, by one of its notches 28 engaging with the locking spring 29. During this process, the empty tube 31a has been stripped from its peg 24 on its way to the lowermost position, while at the same time an empty peg 24 has moved into the position opposite the carriage 35. When all the pegs of the particular frame side are supplied with full bobbins, the carriage 35 automatically returns to its original working position to be filled with fresh bobbins and to start again on its way in the direction of the arrow 45 of Fig. 2, in order to creel the next series of pegs on this frame side.

When a bobbin 23 has run-out in the creel, the corresponding package 48 must be lifted clear of the winding shaft 49 in order to prevent damage to the yarn by the package continuing to run. The yarn tensioning device 51 must be opened to enable the attendant to tie easily and quickly the end projecting from the full bobbin on the creel peg to the tail end of yarn projecting from the package to be made and to introduce the yarn into the tension device 51 and the yarn guide 52. After these operations the package holder 50 may be released from its locked position by means of lever 53 in order to allow the package 48 to come again into contact with the winding shaft 49, and the yarn tension device 51 closed, for the winding to start afresh.

The carriage 35 is made to initiate and carry out the steps described in the previous paragraph, so that the attendant has to do nothing but to tie the ends together and to lower the package 48. For this purpose, every yarn tension device is composed of two sets of pegs 56 and 59. The pegs 56 are fixed to an arm 55 (Figs. 10–12) immovably secured to a stationary rod 54 and carrying an adjusting screw 57. The pegs 59 are fastened to a bell-crank lever 58 in rigid connection with a counterpoise weight 61 and a stop 60, which arrangement loosely pivots on the rod 54. The lever 62—65 also pivots loosely on shaft 54. It is hinged on the one end to a rod 63, hanging down from the package cradle 50 as shown in Fig. 1, while it hingedly carries at its other end a feeler 66 with a stop 67.

The feeler 66 of the yarn tensioning device protrudes into the path of the carriage 35 (Figs. 1, 2, and 9), which has a slanting projection 68. When the carriage 35 travels in the direction of the arrow 45, Fig. 2, the slanting projection 68 depresses the feeler 66 (Figs. 1 and 9) in the direction of the arrow 69 (Fig. 10), whereby the stop 67 forces the arm 62 to swing upward and to raise the rod 63 with its arm 64 into the position shown in Fig. 12. The package cradle 50 is therefore raised from the position shown on the left hand side of Fig. 1 into that shown on the right hand side of the same Fig. 1, being retained in this position by a locking device 53. Simultaneously the arm or bar 64 opens the yarn tensioning device by raising lever 58 by its projection 60, thus turning it into the position shown in Fig. 12. The yarn guiding pegs 59 are therefore displaced clear of the pegs 56 in such a fashion that there is sufficient clearance between the guiding pegs 56 and 59 to allow the easy positioning of the yarn. After tying the end and threading it through the tensioning device 51 and the yarn guide 52, the package holder 50 with the package 48 is lowered again, and with it the rod 63, so that the tensioning mechanism automatically returns from the position indicated in Fig. 12 to that shown in Figs. 1 and 10. The adjusting screw 57 serves to regulate the relative position of the pegs of the yarn tensioning pegs 56 and 59. When the carriage 35 is moved back in the direction opposite to that of the arrow 45 (Fig. 2), the upper side of its slanting projection 68 comes into contact with the feeler 66 and raises it out of the way in the fashion shown in dotted lines in Fig. 12 which means that this upward deflection of the feeler 66 does not in any way interfere with the yarn tensioning pegs 56, 59.

To prevent jamming of the bobbins 23 in the receptacle of the carriage 35, endless conveyor chains or belts 70 as shown in Fig. 13 can be arranged inside the carriage. These chains or belts are moved intermittently and they are fitted with trays 71, each of which carries a bobbin. The bobbins in the trays are thereby intermittently moved forward in such a fashion that by the aid of chute plates or equivalents thereof they are deposited from the top belt or chain to the next following one below, and so on.

In the arrangement shown in Figs. 14 to 16, the hollow receptacle is replaced by a circular magazine 35a fitted with spring clips 73 carrying bobbins 23. The movements of the bobbin magazine can be controlled by a ratchet wheel 74 which is governed by the click 75 on the ratchet lever 76. The latter, in turn, is actuated by stops 77 arranged on a fixed rail 77a.

When the carriage 35 with the circular magazine 35a is displaced by a distance corresponding to the spindle gauge, the ratchet wheel 74 is turned by a predetermined angle corresponding to the distance between two of the bobbins 23 in the circular magazine connected to the ratchet wheel. The mechanism of the bobbin feed 40, 42 is similar to that as described in conjunction with Figs. 1 to 12, except that in the present case the lever 42 swings round a horizontal peg 41 instead of a vertical one, and that here a vertical lever 42 works in unison with the deflectors 44.

In the example illustrated in Figs. 17 and 18, the bobbins 23 are not stored in or on the carriage 35, but they are fed to the carriage singly and one by one by means of an endless belt or chain 78 carrying spring clips 80 and passing over the guiding pulleys 79. The carriage is fitted with a stop 81 next to a funnel, the mouth of which points into the tray 39. The travelling belt or chain 78 moves in the direction of the arrow 82. When one of the spring clips carrying a bobbin comes into contact with the stop 81, the spring clip opens and the bobbin falls through the carriage funnel into the tray 39, whereupon it is placed on the next creel peg by means of the feed arrangement described already for the first example shown in Figs. 1 to 12. In view of the fact that in such an arrangement the upper part of the carriage is eliminated, and the slanting projection 68 is in a lower position than that shown in Fig. 1, rods 83 (Fig. 17) connect every feeler 66 to a lever 85 pivoted on a shaft 84 and arranged in the same plane as the carriage. The slanting projection 68 now influencing the lever 85 pivoted in the centre of the machine, the rod 84 can be made to serve as a common axis for the levers 85 on both frame sides to pivot upon.

In the example shown in Figs. 19–21, each side of the frame carries an endless belt 78 with clips 80, as in Fig. 18. The distinctive features of the arrangement shown in Figs. 19 to 21 are that in this case the upper face of the endless belt is immediately in front of the bobbin pegs to be fed, the carriage 34 partially reaching over the belt and serving merely to carry the feed mechanism 40. Here the deflectors 44 are fitted on stationary brackets 86 of the framing. The endless belt carrying its full complements of bobbins is adjusted in such a way that there is a bobbin in front of every creel peg. It is then only necessary to shift the carriage 35 along the particular frame side to ensure that the bobbins held in the spring clips of the endless belt are automatically placed on the corresponding creel pegs one by one. Also in this case, rods 83 connect the yarn tension feelers 66 to auxiliary levers 85 pivoted on shaft 84 and controlled by the slanting projection 68.

In the examples hitherto described, the two frame sides are supposed to be fitted with separate feeding devices. Fig. 22 shows an example in which the carriage with the feeding arrangements is arranged to travel round the machine in a closed circuit, thus permitting of continuous creeling of the pegs with full bobbins.

In all cases, the carriage can at the same time be fitted with a seat or stand 87 for the attendant, as shown in Figs. 23 and 24, thus causing her to travel round with the carriage to the particular place where the fresh bobbin is fed, and permitting her to tie a knot immediately. This saves her running about and tiring her out and therefore increases the production. If it is desired to clear the machine at the same time of the fly settling on it, and which might interfere with the proper action of the feed mechanism and of the machine parts influenced by it, the carriage can be fitted with suction or blowing devices 88 as shown in Figs. 23 and 24, or such a device can be developed as a secondary carriage, preferably controlled by the same means as the feed carriage.

We claim:

1. In the combination of a winding machine, a plurality of spindle units for holding the bobbins to be unwound, each comprising a rotatable hub, a plurality of pegs extending radially from said hub, resilient retaining means for said hub, a carrier containing full bobbins arranged on said machine for travel in a direction transverse the plane of rotation of said hub, a compartment in said carrier containing a full bobbin adapted to be moved into alignment with one of said pegs, an actuator disposed in alignment with said compartment, and means for releasing said actuator by the movement of the carrier to mount said full bobbin upon said peg.

2. In the combination of a winding machine, a plurality of spindle units for holding the bobbins to be unwound, each comprising a rotatable hub, a plurality of pegs extending radially from said hub, resilient retaining means for said hub, a carrier containing full bobbins arranged on said machine for travel in a direction transverse the plane of rotation of said hub, a compartment in said carrier containing a full bobbin adapted to be moved into alignment with one of said pegs, an actuator disposed in alignment with said compartment, resilient means for energizing said actuator, and a projecting edge upon the machine frame for releasing said actuator at the point of alignment of said compartment and peg.

3. In the combination of a winding machine, a plurality of spindle units for holding the bobbins to be unwound, each comprising a rotatable hub, a plurality of pegs extending radially from said hub, resilient retaining means for said hub, a carrier containing full bobbins arranged on said machine for travel in a direction transverse the plane of rotation of said hub, a compartment in said carrier containing a full bobbin adapted to be moved into alignment with one of said pegs, an actuator disposed in alignment with said compartment, means for releasing said actuator by the movement of the carrier to mount said full bobbin upon said peg, and means upon said carrier for actuating said hub to place the bobbin mounted upon the peg into operative position.

4. The combination claimed in claim 3, wherein said last-mentioned means comprises an arm mounted upon said carrier, another peg of said hub in the path of said arm, said arm being angularly disposed, whereby upon coaction with said last-mentioned peg, the hub is rotated against the force of said resilient retaining means therefor to place said last-mentioned peg in position to receive a full bobbin and to place said first-mentioned peg with a full bobbin thereon in position for operation.

5. The combination claimed in claim 3, wherein said last-mentioned means comprises an articulated arm mounted upon said carrier, a stop for said arm one side thereof preventing movement thereof in one direction, yielding means connected to said arm permitting a yielding movement thereof in the reverse direction, another peg of said hub in the path of said arm, said arm being angularly disposed, whereby upon coaction with said last-mentioned peg during movement of said arm in the first-mentioned direction the hub is rotated against the force of said resilient retaining means therefor to place said last-mentioned peg in position to receive a full bobbin and to place said first-mentioned peg with a full bobbin thereon in position for operation.

6. The combination claimed in claim 3, wherein said last-mentioned means comprises an arm mounted upon said carrier, another peg of said hub in the path of said arm, said arm being angularly disposed, whereby upon coacting with said last-mentioned peg, the hub is rotated against the force of said resilient retaining means therefor to place said last-mentioned peg in position to receive a full bobbin and to place said first-mentioned peg with a full bobbin thereon in position for operation, a third peg on said hub carrying a bobbin frame from which the thread has been unwound, and a fixed cam adjacent said hub, overlying the end of said bobbin frame, whereby said cam removes said bobbin frame from said last-mentioned peg during the rotation of said hub.

7. In the combination of a winding machine, a plurality of spindle units for holding the bobbins to be unwound, a traveling carrier arranged on said machine containing a plurality of full bobbins, a compartment in said carrier adapted to hold one of said full bobbins in alignment with one of said spindle units, and means for disposing one of said bobbins in said compartment controlled by the movement of said carrier.

8. The combination claimed in claim 7, wherein said last-mentioned means comprises a star-shaped distributor extending into the path of said full bobbins contained in said carrier, a ratchet wheel connected with said distributor, and a plurality of projections extending from the machine frame into the path of said ratchet wheel whereby said ratchet wheel and distributor are actuated by the movement of the carrier along the machine frame.

9. In the combination of a winding machine, a winding shaft, a plurality of spindle units for holding the bobbins to be unwound, a winding station associated with each spindle unit comprising a yarn tensioning device, a yarn guide and a package cradle adjustably disposed with respect to said winding shaft, said yarn tensioning device comprising two arms yieldingly rockable with respect to each other, pegs on said arms for tensioning the thread, a stop on one of said arms, a rod connected to said package cradle, a bar upon said rod cooperable with said stop, a movable member arranged on said machine adapted to travel past said winding stations, an inclined projection upon said carrier, a feeling lever connected to said rod in the path of said projection, whereby upon actuation of said feeling lever by said inclined projection said package cradle is separated from said winding shaft and said yarn tensioning device is opened for the purpose of easily effecting a joint between the tail end of the yarn projecting from the package and the end projecting from the full bobbin.

10. In the combination of a winding machine, a winding shaft, a plurality of spindle units for holding the bobbins to be unwound, a winding station associated with each spindle unit comprising a yarn tensioning device, a yarn guide and a package cradle adjustably disposed with respect to said winding shaft, said yarn tensioning device comprising two arms yieldingly rockable with respect to each other, pegs on said arms for tensioning the thread, an adjusting screw intermediate said arms for varying the spacing of the pegs and the resulting tension upon the thread, a stop on one of said arms, a rod connected to said package cradle, a bar upon said rod cooperable with said stop, a movable member arranged on said machine adapted to travel past said winding stations, an inclined projection upon said member, a feeling lever connected to said rod in the path of said projection, whereby upon actuation of said feeling lever by said inclined projection said package cradle is separated from said winding shaft and said yarn tensioning device is opened for the purpose of easily effecting a joint between the tail-end of the yarn projecting from the package and the end projecting from the full bobbin.

11. In the combination of a winding machine, a plurality of spindle units for holding the bobbins to be unwound, an endless conveyor arranged on said machine having a plurality of full bobbins extending therefrom, retaining means for said bobbins on said conveyor, a movable carriage cooperable with said spindle units adapted to transfer the individual bobbins from said endless conveyor to said spindle units, a stop on said carriage in the path of said bobbins for disengaging said retaining means, and a guide plate in said carriage for leading the disengaged bobbin to a point therein for alignment with a spindle unit.

12. In the combination of a winding machine, a plurality of spindle units for holding the bobbins to be unwound, an endless conveyor arranged on said machine, having a plurality of full bobbins therein in alignment with said spindle units, a movable carriage cooperable with said spindle units, and means on said carriage to transfer automatically and successively the individual bobbins directly from said endless conveyor to said spindle units as the carriage executes its movement.

13. In the combination of a winding machine, a plurality of spindle units for holding the bobbins to be unwound, a traveling carrier arranged on said machine containing a plurality of full bobbins, a compartment in said carrier adapted to hold one of said full bobbins in alignment with one of said spindle units, means for disposing one of said bobbins in said compartment controlled by the movement of said carrier, and means for automatically transferring said one bobbin from said compartment to a spindle of said spindle unit in horizontal alignment therewith.

14. In the combination of a winding machine, a plurality of spindle units for holding the bobbins to be unwound, a traveling carrier arranged on said machine containing a plurality of full bobbins, a compartment in said carrier adapted to hold one of said full bobbins in alignment with one of said spindle units, means for disposing one of said bobbins in said compartment controlled by the movement of said carrier, means for automatically transferring said one bobbin from said compartment to a spindle of said spindle unit in horizontal alignment therewith, and means for automatically disposing said one bobbin into a vertical position for unwinding.

15. In the combination of a winding machine, a plurality of spindle units for holding the bobbins to be unwound, a traveling carrier arranged on said machine containing a plurality of full bobbins, a compartment in said carrier adapted to hold one of said full bobbins in alignment with one of said spindle units, means for disposing one of said bobbins in said compartment controlled by the movement of said carrier, means for automatically transferring said one bobbin from said compartment to a spindle of said spindle unit in horizontal alignment therewith, and means for automatically disposing said one bobbin into a vertical position for unwinding and simultaneously discarding the bobbin frame from which the thread has been unwound and preparing another spindle for receiving a full bobbin.

16. In a winding machine, a plurality of fixedly positioned spindle units, a carrier containing a plurality of full bobbins traveling along said machine past said spindle units, an actuator moving with said carrier, means for automatically impelling said actuator to mount a full bobbin upon a spindle of said spindle unit in horizontal alignment with said bobbin, and means for automatically disposing said full bobbin into operative position for unwinding and simultaneously stripping the bobbin frame from which the thread has been unwound from its spindle in preparation for receiving another full bobbin thereon.

17. In a winding machine, a plurality of fixedly positioned spindle units, a carrier containing a plurality of full bobbins travelling along said machine past said spindle units, an actuator moving with said carrier, resilient means for operating said actuator, deflecting plates corresponding to said spindle units for storing energy in said resilient means by the movement of said actuator and for releasing said energy to impel said actuator to mount a full bobbin upon a spindle of said spindle unit in horizontal alignment with said bobbin, means for automatically disposing said full bobbin into operative position for unwinding and simultaneously stripping the bobbin frame from which the thread has been unwound from its spindle in preparation for receiving another full bobbin thereon.

18. In a winding machine, a plurality of fixedly positioned spindle units rotatable in a series of vertical planes each consisting of a plurality of spindles having a common center, a carrier containing a plurality of full bobbins traveling along said machine transversely to said planes, an actuator moving with said carrier, means for automatically impelling said actuator to mount a full bobbin upon a spindle in horizontal alignment with said bobbin, means for automatically disposing said full bobbin into operative position for unwinding by the movement of said carrier, and a cam adjacent the center of each spindle unit for stripping the bobbin frame from which the thread has been unwound from its spindle by the movement of said spindle unit in its vertical plane in preparation for receiving another full bobbin thereon.

19. In a winding machine, a plurality of fixedly positioned spindle units rotatable in a series of vertical planes each consisting of a plurality of spindles having a common center, a carrier containing a plurality of full bobbins traveling along said machine transversely to said planes, an actuator mounted on said carrier, means for automatically impelling said actuator to mount a full bobbin upon a spindle in horizontal alignment with said bobbin, and means for automatically disposing said full bobbin into operative position for unwinding and simultaneously stripping the bobbin frame from which the thread has been unwound from the spindle in preparation for receiving another full bobbin thereon.

20. In the combination of a winding machine, a plurality of spindle units for holding the bobbins to be unwound, an endless conveyor arranged on said machine having a plurality of full bobbins extending therefrom, retaining means for said bobbins on said conveyor, a movable carriage cooperable with said spindle units adapted to transfer the individual bobbins from said endless conveyor to said spindle units, a stop on said carriage in the path of said bobbins for disengaging said retaining means, a trough in said carriage, a guide plate in said carriage for guiding the released bobbin to said trough for alignment with a spindle unit, and an actuator on said carriage for impelling the released bobbin onto a horizontally disposed spindle of said spindle unit.

21. In a winding machine, a plurality of spindle units for holding the bobbins to be unwound, traveling carrier means arranged on said machine containing a plurality of full bobbins comprising a bobbin holder adapted to hold one of said full bobbins in alignment with one of said spindle units, and means for transferring said one bobbin from said holder to a spindle of said spindle unit in alignment therewith controlled by the movement of said traveling carrier means along the machine.

22. In a winding machine, a plurality of spindle units for holding the bobbins to be unwound, traveling carrier means arranged on said machine containing a plurality of full bobbins comprising a bobbin holder adapted to hold one of said full bobbins in alignment with one of said spindle units, means for transferring said one bobbin from said holder to a spindle of said spindle unit in alignment therewith controlled by the movement of said traveling carrier means along the machine, and means controlled by the movement of said carrier means for automatically disposing said one bobbin into operative position for unwinding.

23. In a winding machine, a plurality of spindle units for holding the bobbins to be unwound, traveling carrier means arranged on said machine containing a plurality of full bobbins comprising a bobbin holder adapted to hold one of said full bobbins in alignment with one of said spindle units, means for transferring said one bobbin from said holder to a spindle of said spindle unit in alignment therewith controlled by the movement of said traveling carrier means along the machine, means controlled by the movement of said carrier means for automatically disposing said one bobbin into operative position for unwinding, and means for automatically discarding the bobbin frame from which the thread has been unwound.

24. In a winding machine, a spindle unit for holding bobbins to be unwound, conveying means for supplying bobbins to said spindle unit, said spindle unit comprising a hub rotatable about an axis parallel to the direction of movement of said conveying means, a plurality of pegs extending radially from said hub, means controlled by the movement of said conveying means for mounting a bobbin upon one of said pegs and for rotating said hub to place the bobbin mounted upon the peg into operative position.

25. In a winding machine, a spindle unit for holding bobbins to be unwound, conveying means for supplying bobbins to said spindle unit, said spindle unit comprising a hub rotatable about an axis parallel to the direction of movement of said conveying means, a plurality of pegs extending radially from said hub, means controlled by the movement of said conveying means for mounting a bobbin upon one of said pegs and for rotating said hub to place the bobbin mounted upon the peg into operative position, and means for stripping the bobbin frame from which the thread has been unwound.

26. In a winding machine, a spindle unit for holding bobbins to be unwound, conveying means for supplying bobbins to said spindle unit, said spindle unit comprising a hub rotatable about an axis parallel to the direction of movement of said conveying means, a plurality of pegs extending radially from said hub, means controlled by the movement of said conveying means for mounting a bobbin upon one of said pegs, for rotating said hub to place the bobbin mounted upon the peg into operative position and for disposing another spindle in position for receiving a full bobbin, and means for stripping the bobbin frame from which the thread has been unwound.

27. In a winding machine, a plurality of spindle units for holding the bobbins to be unwound, traveling carrier means arranged on said machine containing a plurality of full bobbins comprising a bobbin holder adapted to hold one of said full bobbins in alignment with one of said spindle units, means for disposing the bobbin in said holder in alignment with said one spindle unit controlled by the movement of said carrier means, and means for transferring said one bobbin from said holder to a spindle of said spindle unit in alignment therewith controlled by the movement of said traveling carrier means along the machine.

28. In the combination of a winding machine, a winding shaft, a plurality of spindle units for holding the bobbins to be unwound, a winding station associated with each spindle unit comprising a yarn tensioning device, a yarn guide and a package cradle adjustably disposed with respect to said winding shaft, connections interposed between said yarn tensioning device and said package cradle comprising a lug on said tensioning device and an arm connected with said package cradle cooperable with said lug, a movable member arranged on said machine adapted to travel past said winding stations, a projection on said member, a lever in the path of said projection, connecting means between said lever and said connections whereby upon the actuation of said lever by said projection said package cradle is separated from said winding shaft and said yarn tensioning device is opened for the purpose of easily effecting a joint between the tail-end of the yarn projecting from the package and the end projecting from the full bobbin.

29. In the combination of a winding machine, a winding shaft, a plurality of spindle units for holding the bobbins to be unwound, a winding station associated with each spindle unit comprising a yarn tensioning device, a yarn guide and a package cradle adjustably disposed with respect to said winding shaft, connections interposed between said yarn tensioning device and said package cradle comprising a lug on said tensioning device and an arm connected with said package cradle cooperable with said lug, a movable member arranged on said machine adapted to travel past said winding stations, a projection on said member, a jointed lever in the path of said projection attached to said connections, said jointed lever adapted to swing freely upon actuation thereof by said inclined projection travelling in one direction, and said jointed lever adapted to move said connections upon the actuation thereof by said projection travelling in the other direction whereby said package cradle is separated from said winding shaft and said yarn tensioning device is opened for the purpose of easily effecting a joint between the tail-end of the yarn projecting from the package and the end projecting from the full bobbin.

WILHELM REINERS.
GUSTAV KAHLISCH.

CERTIFICATE OF CORRECTION.

Patent No. 2,010,465.  August 6, 1935.

WILHELM REINERS, ET AL.

It is hereby certified that error appears in the printed specification of the above numbered patent requiring correction as follows: Page 4, first column, line 74, claim 9, for "carrier" read member; and that the said Letters Patent should be read with this correction therein that the same may conform to the record of the case in the Patent Office.

Signed and sealed this 10th day of September, A. D. 1935.

Leslie Frazer (Seal)  Acting Commissioner of Patents.